C. STOUT.
Barrel-Head Machine.

No. 207,455. Patented Aug. 27, 1878.

WITNESSES

INVENTOR
Charles Stout

UNITED STATES PATENT OFFICE.

CHARLES STOUT, OF LIVERPOOL, ENGLAND, ASSIGNOR OF ONE-HALF HIS RIGHT TO WILLIAM PHILLIPS THOMPSON, OF SAME PLACE.

IMPROVEMENT IN BARREL-HEAD MACHINES.

Specification forming part of Letters Patent No. 207,455, dated August 27, 1878; application filed May 8, 1878.

*To all whom it may concern:*

Be it known that I, CHARLES STOUT, of Liverpool, in the county of Lancaster, England, have invented new and useful Improvements in Band-Sawing Machines for Cutting Barrel-Heads and other circular arcs; and that the following specification is a full, clear, and exact description of the same, reference being had to the accompanying drawings.

Figure 1:
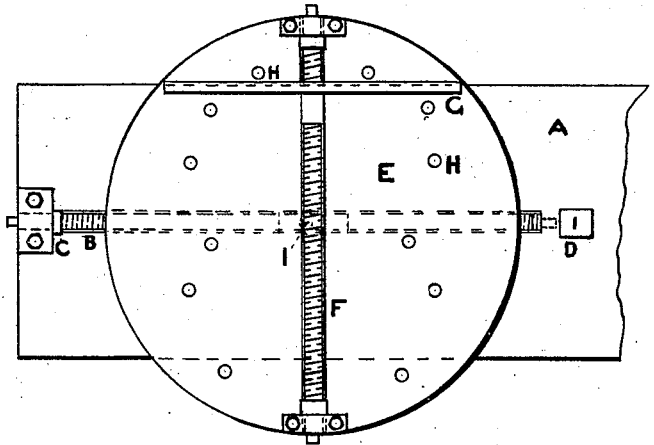
Figure 3:
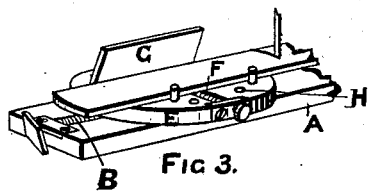
Figure 2:
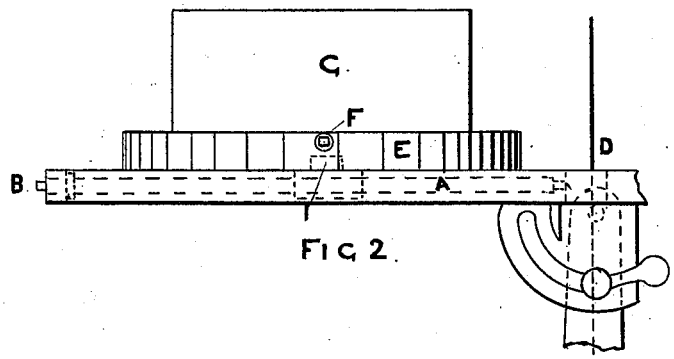

Figure 1 is a top-plan view of my improved table; Fig. 2, a side elevation of the same; Fig. 3, a perspective view of the same with a board or blank in position thereon.

In cutting barrel-heads by the band-saw it is usual to mark them out and guide them by hand. Now, my invention is to cut them by machinery without marking.

In the ordinary table A of a band-saw, preferably capable of swiveling to an angle, so as to cut on the bevel, I construct a screw, B, held in position by collar C or otherwise. This screw is preferably placed in the cut left to insert the saw D into the table; but while in the same line with the saw-edge, and at right angles to the side of the same, the screw does not extend up to the saw. On this screw is a slide-block, sliding in the slide or cut, and having a pin, I, or axis on its upper part, upon which works a table, E.

If only one size of head is required to be made in the machine, the screw B can be omitted and the pivot on which the table E works can be fixed immovably in the swiveling table A or any other firm support. In E, again, is a screw, F, similar to B, and this works a sliding nut carrying a fence, G; or, instead of this screw-nut, fence-holes H H can be drilled in the table for the insertion of pegs, any two of which will act for a fence.

The mode of action is as follows: The center I, being fixed at a distance from the edge of the saw equal to the radius of the circle to be cut if it is wanted that the pieces shall be interchangeable, the fence G is placed at the exact distance from the center of the table that the joint between two boards is to come from the center of the barrel-head. One or more boards are then placed on the table E against fence G, (or pegs placed in holes H H at the right distance,) and are pressed down, by hand or otherwise, onto two or more little points projecting from table E, so as to keep the bottom one steady, though this precaution is not absolutely necessary, and the table is turned slowly round till the edges overlapping the cutting-circle are cut off. Then other boards are placed on, and so on.

So long as the boards are the same width, and the positions of the center I and fence G adjusted correctly, every board will be cut true, so as to be interchangeable from one head to another.

If seven inch boards, for instance, are to be cut, the fence is preferably placed three and a half inches, or ten inches from the center; then the two sides of the head are interchangeable.

The table E is not bound to be a solid disk. A quadrant or other segment of a circle would do; or a mere clamp on arms extending from the central pivot might, in certain circumstances, be made to act; but I prefer a solid disk as simplest.

It is to be particularly noted that my arrangement of parts is especially adapted for the production of barrel-heads, inasmuch as it permits of the sections or segments being cut of different radii, and also of different sizes or widths according to the width of the lumber, the arrangement allowing the formation of a head in a single piece, and also the formation of central and of outside sections or segments corresponding with each other.

I claim as my invention—

1. The combination of the saw D, the flat pivoted table E, adjustable to and from the saw, and the horizontal fence or support G, extending across the face of the table and movable to and from the center thereof, as shown, whereby sections or segments of barrel-heads may be sawed of different sizes and forms, as set forth.

2. In combination with the saw, the rotary and laterally-adjustable table E, provided with the adjustable fence, and the adjustable pins located on opposite sides of the center, whereby the table is adapted to hold the central sections of barrel-heads.

CHARLES STOUT.

Witnesses:
C. H. COLTON,
E. GARDNER COLTON.